Oct. 23, 1956  H. N. FAWCETT  2,767,917
MECHANICAL VECTOR COMPUTER FOR A SOUND RANGING AZIMUTH DETECTOR
Filed Dec. 24, 1952  2 Sheets-Sheet 1

INVENTOR.
HOWARD N. FAWCETT
BY Harry M. Saragovitz
Attorney

INVENTOR.
HOWARD N. FAWCETT
BY
Harry M. Saragovitz
Attorney

United States Patent Office 2,767,917
Patented Oct. 23, 1956

2,767,917
MECHANICAL VECTOR COMPUTER FOR A SOUND RANGING AZIMUTH DETECTOR

Howard N. Fawcett, Pleasantville, N. Y., assignor to the United States of America as represented by the Secretary of the Army Application December 24, 1952, Serial No. 327,873

7 Claims. (Cl. 235—61.5)

This invention relates to sound ranging azimuth detectors and more particularly to a mechanical vector computer for a sound ranging azimuth detector.

In azimuth measuring units designed to record the sound of artillery fire or shell detonations, the azimuth from which the sound originated may be determined from the playback of the records. Such a system may comprise four movable playback heads so arranged that the amount of relative displacement of the playback heads is proportional to the differences in time of arrival of the sound wave front to a plurality of microphones placed in a definite predetermined geometric array. It is desirable to convert these relative displacements directly into a reading of the azimuth of sound arrival by means of a mechanical computer adapted to compensate for departures from the normal values of the speed of the recording medium and the velocity of sound. By aligning the recorded signals detected by each microphone into register with a reference microphone signal, the azimuth may be read from an instrument dial actuated by the mechanical computer.

It is therefore an object of the present invention to provide a vector computer for automatically determining the azimuth from which the sounds originated.

It is another object of the present invention to provide a vector computer for converting the relative displacement of recording playback heads directly into a reading of the azimuth of sound arrival.

It is yet another object of the present invention to provide a vector computer which compensates for departures from the nominal values of the speeds of the recording medium and of the velocity of sound.

In accordance with the present invention there is provided a computer adapted for converting the relative displacement of two pairs of playback heads into an azimuth reading. The computer includes a truncated spherically shaped roller contact adapted to be actuated by a pair of coplanar orthogonally positioned plunger rods operatively connected to the mechanism for displacing the playback heads. Means are provided for positioning the roller contact so that it is free to swing as a pendulum about a predetermined horizontal and vertical axis when actuated by the combined movement of the plunger rods.

For a better understanding of the present invention together with further objects thereof, reference is had to the following description taken in connection with the accompanying drawings in which.

Figure 1:
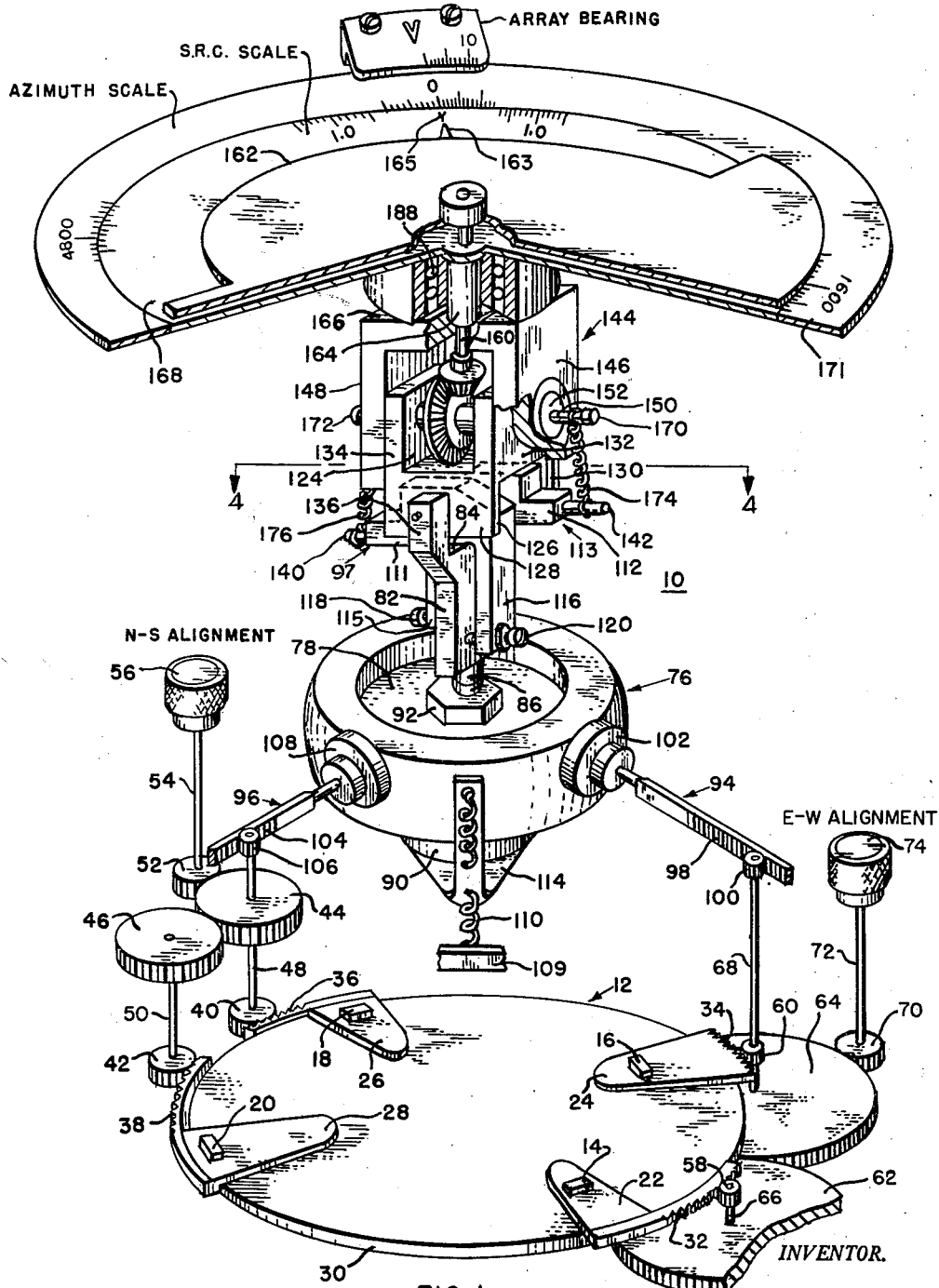
Fig. 1 illustrates an isometric view, partially cut away, of the vector computer, and the mechanism for actuating the computer in accordance with the angular position of the playback heads.
Figure 4:
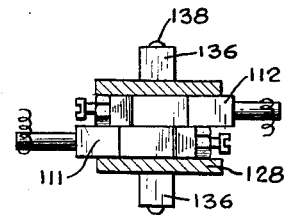
Figure 3:
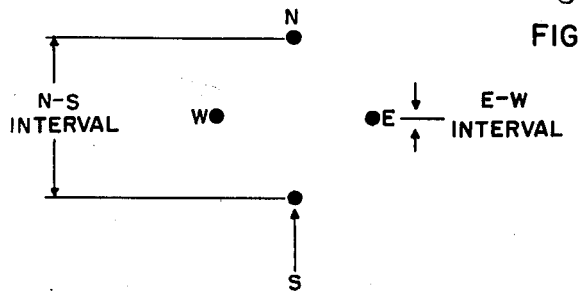

Fig. 3 schematically illustrates an arrangement of a simple microphone array; and Fig. 4 is a section taken along lines 4—4 of Fig. 1 which illustrates the position of the rocker arms.

In the description below, the words "vertical" and "horizontal" are assumed to describe relative positions.

Figure 2:
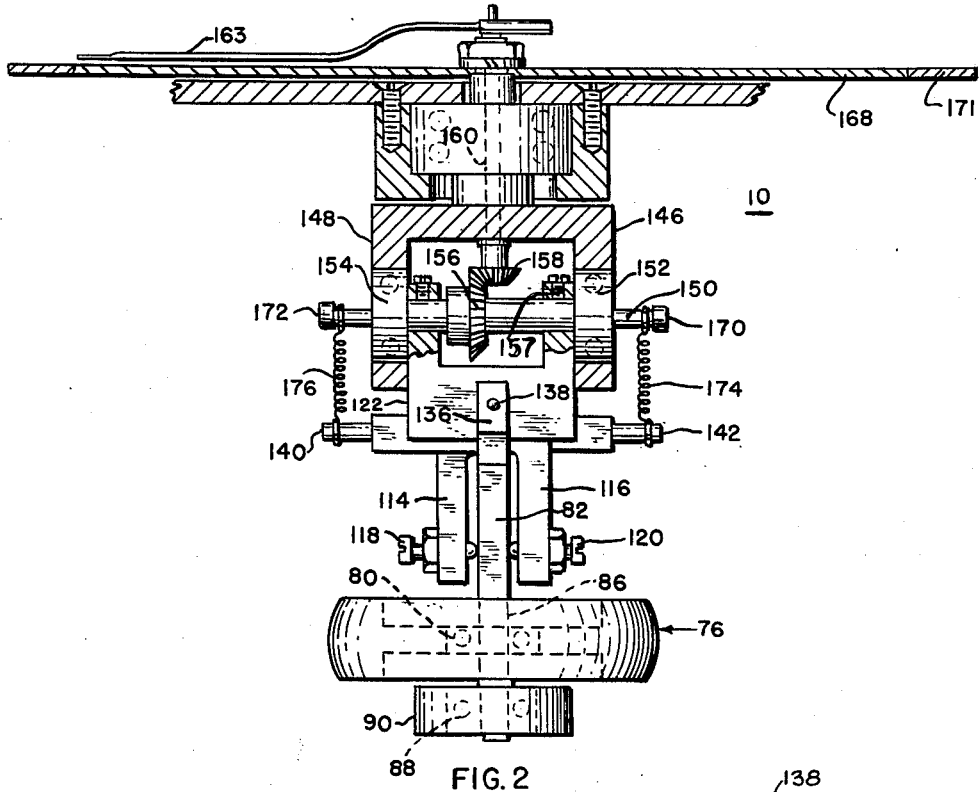
Fig. 2 is a front elevation view, partially in cross-section, of the vector computer.

Referring to Figs. 1 and 2 of the drawing, there is shown at 10 a computer assembly adapted to operate in conjunction with a record playback assembly 12 including four playback heads 14, 16, 18, and 20 affixed to and extending upwardly from respective movable mountings 22, 24, 26, and 28 rotatably mounted about the axis of revolution of horizontally disposed support disk 30. For convenience, heads 14 and 16 may be designated as the east-west playback heads and heads 18 and 20 may be designated as the north-south playback heads. Each of said mountings is provided with a circumferentially disposed spur gear shown respectively at 32, 34, 36 and 38. North-south playback heads 18 and 20 may be rotatably displaced in opposite angular directions along the periphery of disk 30 by pinion gears 40 and 42 which are respectively driven by meshed spur gears 44 and 46. As shown, pinion gear 40 and spur gear 44 are mounted on vertical shaft 48 and pinion gear 42 and spur gear 46 are mounted on vertical shaft 50. Gear 44 meshes with pinion gear 52 which is mounted at one end of north-south alignment shaft 54, the other end of shaft 54 being terminated by a knob 56. The gearing is so arranged that by rotating knob 56 simultaneous equal displacement of north-south playback heads 18 and 20 in opposite angular directions is achieved. East-west playback heads 14 and 16 may be rotatably displaced in opposite angular directions along the periphery of disk 30 by pinion gears 58 and 60 which are driven respectively by meshed spur gears 62 and 64. Pinion gear 58 and spur gear 62 are mounted on vertical shaft 66 and pinion gear 60 and spur gear 64 are mounted on vertical shaft 68. Gear 64 meshes with pinion 70 mounted at one end of east-west control shaft 72, the other end of control shaft 72 being terminated by knob 74. By this arrangement, simultaneous equal displacement of east-west heads 14 and 16 in opposite angular directions may be achieved by rotating knob 74. A conventional rotatably driven plastic recording surface, not shown, on which is recorded the sound to be located, is in contact with the four playback heads and the amount of the relative angular displacement of the heads may be limited to an angle corresponding to a half-second of recording time by any suitable means well known in the art.

Computer 10 includes a truncated spherically shaped roller contact 76 mounted as a pendulum with two degrees of freedom. As will hereinafter be explained, roller contact 76 is positioned by two planar surfaces operating at right angles and at right angles to the pendulum axis. Integral with roller contact 76 and centrally positioned therein intermediate the truncated ends is an annular disk 78. A roller bearing 80 is affixed to the inner periphery of said annular disk. A yoke bracket plate 82 provided with a substantially U-shaped cutout 84 at one end and a stepped, partially threaded, shaft 86 at the other end, extends upwardly from the center of disk 78 in a plane perpendicular to the flat surface of disk 78 with shaft 86 extending through and journaled in bearing 80 and also journaled in roller bearing 88 mounted in anchor ring collar 90. To maintain bracket plate 82 perpendicular to the flat surface of disk 78 at all times, the threaded portion of shaft 86 engages a positioning nut 92.

Roller contact 76 is positioned in accordance with the relative angular displacement of playback heads 14—20 by means of two coplanar orthogonally positioned plunger rods 94 and 96. As shown, one end of plunger rod 94 is provided with a straight tooth rack 98 which meshes with pinion gear 100 mounted on shaft 68 and the other end of plunger rod 94 is terminated by a contact disk 102 in abutment with the spherical surface of roller contact 76. Similarly, plunger rod 96 is provided at one end with a straight tooth rack 104 which meshes with pinion gear 106 on shaft 48 and the other end of plunger rod 96 is terminated by contact disk 108 in abutment with the spherical surface of roller contact 76. The spherical surface of roller contact 76 is maintained in abutment with the end faces of disks 102 and 108 by means of tensioned spring 110, one end of which is affixed to the chassis indicated at 109 and the other end is affixed to spring bracket 114 affixed to anchor ring collar 90. The amount of displacement of the center point of roller contact 76 is of course dependent upon the relative movement of plunger rods 94 and 96.

Two substantially L-shaped rocker arms 97 and 112 of identical construction are provided with their respective horizontal legs 111 and 113 in juxtaposition and disposed transversely across U-shaped cutout 84 and with the respective vertical legs 115 and 116 of each rocker arm extending downwardly towards disk 78 and respectively positioned on opposite sides of yoke bracket plate 82. As shown, vertical legs 115 and 116 are spaced from the planar surfaces of said yoke plate bracket, and maintained substantially parallel thereto, by means of horizontal adjustment screws 118 and 120 which extend through holes provided therefor in each of said vertical legs. Superimposed on juxtapositioned horizontal legs 111 and 113 and spaced therefrom is a gear housing 122 comprising integrated upper and lower U-shaped sections 124 and 126 having end walls orthogonally positioned relative to each other. Lower U-shaped section 126 is bounded by side walls 128 and 130 transversely positioned across U-shaped cutout 84 intermediate the arms 136 of yoke bracket plate 82 bounding U-shaped cutout 84 and horizontal rocker arm legs 111 and 113 respectively. Yoke bracket plate 82 is pivotally mounted to lower U-shaped section 126 and rocker arms 97 and 112 by means of a pivot shaft 138 which extends through one arm 136, through end wall 128, through both rocker arm horizontal legs 111 and 113, through end wall 130, and through the other arm 136. As shown, yoke bracket plate 82 is adapted to rotate with pivot shaft 138 and is centrally pivoted with respect to gear housing 122 and rocker arms 97 and 112. Studs 140 and 142 are respectively provided in the ends of horizontal legs 111 and 113.

Superimposed on gear housing 122 is a substantially U-shaped yoke joint frame 144 having its side walls 146 and 148 juxtapositioned on end walls 132 and 134 of upper U-shaped section 124. A pivotally arranged shaft 150 disposed above and substantially parallel to juxtaposed horizontal legs 111 and 113 extends through side wall 146, through end wall 132, through upper U-shaped section 124, and through end wall 134 and side wall 148. As shown, shaft 150 is affixed to gear housing 122 by means of threaded studs 157 (Fig. 2) and rotatable therewith, and is journaled in bearings 152 and 154 centrally positioned in side walls 146 and 148, respectively. The protruding ends of shaft 150 are provided with horizontally positioned studs 170 and 172. Affixed between the ends of stud 170 and stud 142 is a relief spring 174. Similarly, a relief spring 176 is affixed between stud 140 and stud 172. Affixed to shaft 150 within upper U-shaped section 124 is driving bevel gear 156 which meshes with bevel pinion gear 158 having its axis perpendicular to shaft 150. Affixed to pinion gear 158 is one end of a vertical shaft 160, hereinafter referred to as the survey range correction shaft, which is terminated at its other end by an index needle marker 163 adapted to rotate with shaft 160. Pivot shaft 138 is maintained normally rigid by the spring tension applied through springs 174 and 176 so that, under normal operating conditions it cannot be rotated about its axis. However, a condition may arise wherein shaft 150 comes to rest in a position parallel to either of the plunger rods 94 or 96. In other words, the shaft 150 may come to rest on a dead center with one of the roller contact positioning surfaces. In this circumstance any further forward motion of the affected positioning surface may damage or strain the mechanism unless some relief is provided. Relief springs 174 and 176 provide this function. As the affected position surface is pushed forward, pivot shaft 138 will rotate about its axis and as a result yoke bracket plate 82 will pivot about the axis thereby unbalancing the rocker arms 97 and 112. This action will elongate one relief spring and compress the other such that yoke joint frame 144 is caused to rotate about its vertical axis and will come to rest when the relief springs return to their normal tensioned position to again maintain the axis of pivot shaft 138 substantially rigid. Encompassing survey range correction shaft 160 is a tubular shaft 164, hereinafter referred to as the azimuth shaft, one end of which is affixed to base 166 of yoke joint frame 144. Affixed to the other end of tubular shaft 164 and rotatable therewith is a horizontally positioned azimuth vernier indicating dial 168 which is encompassed by a fixed calibrated azimuth scale 171 from which the azimuth position is determined. Azimuth shaft 164 is journaled in bearing 188 superimposed on base 166 and spaced therefrom. To indicate direction, the azimuth scale 171 may have the numbers 0, 1600, 3200, and 4800 designated thereon to represent respectively the North, East, South and West azimuth.

To better understand the operation of the computer, reference is made to Fig. 3 which shows a simple microphone array and it is to be assumed that the fixed azimuth scale 171 is set at North or zero reading. The azimuth measuring system consists essentially of means for measuring the amount of relative displacement of the four playback heads 14—20 required to achieve simultaneous playback of the four signals recorded from the four microphones (Fig. 3) of the array for a distant source of sound. With simultaneous playback, which may be indicated by any suitable means, the amounts of relative displacement of the playback heads are proportional to the difference in time of arrival of the sound wave front to the various microphones of the array. These relative displacements are directly converted into a reading of azimuth of sound arrival by the computer which also furnishes a correction factor for the survey range reading that compensates for departures from the nominal values of the speeds of the recording medium and of the velocity of the sound due to any temperature variation or other natural phenomena. Thus the purpose of the computer is to perform two independent functions; first, to determine the azimuth of the arriving sound; and second, to provide a "time factor" which represents the angle of rotation which has taken place by the recording disk while the sound has traveled from, say South to North microphone in the simplest case, or from any other side of the array, to the opposite side in the more complex situation. The first function is accomplished by rotation of the computer which is rigidly attached to azimuth vernier indicating dial 168 and the position of dial 168 is read off surrounding azimuth scale 171 which, as previously mentioned, has been positioned to the azimuth of the north-south axis of the microphone array (Fig. 3). The second function is related to the size of the angle assumed by the computer relative to its zero or vertical axis. This second function is measured by the degree of the arc traversed by the center point of roller contact 76 as it pivots only about shaft 150 by means of yoke bracket 82 and gear housing 122. For example, should the sound arrive from the South azimuth so that the East-West time interval is zero, then movement of the North-South alignment control 56 will cause the center point of contact 76 to pivot only about shaft 150 without rotation of the azimuth indicating dial 168. This action is communicated to needle indicator 163 through meshed gears 156 and 158. Movement of N–S alignment control 56 will cause gear housing 122 to pivot about shaft 150 and since shaft 150 is affixed to gear housing 122, the rotational movement of gear 156 will be translated to gear 150 which in turn affects the position of needle marker 163. The position of needle marker 163 does not indicate azimuth but only presents a survey correction, or speed factor, which is independent of azimuth. With sound arriving at the antenna array shown in Figure 3 from all other azimuths, it can be shown mathematically that the azimuth indication is independent of the speed of sound travel and dependent only on its direction of arrival. Hence the position of needle marker 163 indicates only whether the sound wave is moving between the microphones at a rate corresponding to the normal velocity of sound. If there is any appreciable departure this departure may be interpretable in terms of weather.

In discussing the azimuth operation of the computer, it is to be assumed that roller contact 76 is in such a position that its center is not in the plane of the vertical axis represented by shaft 160 and the horizontal axis represented by shaft 150. As previously explained, a single control knob 56 is provided for simultaneous equal displacements of the north-south playback heads in opposite angular directions from their predetermined zero positions. Similarly, control knob 74 is provided for positioning the east-west playback heads. The angular rotation of the playback heads resulting from these two discrete adjustments is coupled respectively to the two plunger rods 96 and 94 moving at right angles with respect to each other.

With the sound approaching from the north after the alignment of signals, north-south plunger 96 will be in its extreme position, survey correction needle marker 163 will be at approximately 1.0 for standard meteorological conditions and the azimuth reading will be zero. With the sound approaching from the south, the north-south plunger 96 will be withdrawn when the signals are aligned and a survey correction will give the same reading on the other scale and the azimuth reading will be 3200, which is 180° displaced from the zero reading. With the sound approaching from the east, the north-south plunger will be in its center or zero position when the signals are aligned; the east-west plunger 94 takes the position rotating yoke joint frame 144, since pivot 138 is held rigidly by the tension of springs 174 and 176, and the azimuth scale will give an azimuth reading of 1600 which is halfway between the zero reading and the 180° displaced reading. When the signal is from the west, the north-south plunger position 96 remains fixed; the east-west plunger will be in the opposite sense and yoke joint frame 144 will be rotated so that the azimuth scale will now read 4800. In the same manner, yoke joint frame 144 and the azimuth scale may be rotatably positioned by the combined operation of the plungers to give the correct bearing for intermediate directions of arrival. The manner of rotation of yoke frame member 144 can more readily be understood if one keeps in mind that the center of roller contact 76 is being displaced by the action of plunger faces 102 and 108. The amounts of relative angular displacement of the pairs of playback heads, and hence the amount of movement of faces 102 and 108, are proportional to the difference in the time of arrival of the sound wave front. With pivot 138 held substantially rigid by the tension of springs 174 and 176, the center of roller contact 76 will be displaced first in one direction by one of the plunger faces and then in a direction orthogonal to the first direction by the other plunger face. Inasmuch as pivot shaft 138 is held rigid so that there is no pivot action of yoke bracket plate 82 about this shaft, it is apparent that yoke bracket plate 82 will revolve in bearings 80 and 88 until no further motion is applied to either of the plunger rods 96 and 94. This will occur only when there is simultaneous playback indicated by the aligned signals from each microphone. The amount of rotation of yoke bracket plate 82 will, of course, depend upon the relative angular displacements of the playback heads necessary to align the signals. Yoke bracket plate 82 will rotate about the axis of azimuth shaft 164 and thereby rotate yoke joint frame 144 accordingly so that the relative angular displacements of the playback heads are converted directly into a reading of the azimuth of sound arrival.

Referring now to the array shown in Fig. 3, with sound arrival from south azimuth (arrow), the azimuth reading will be independent of the time arrival of the sound from south to north microphones. Thus the movement of north-south alignment knob 56 will provide equal displacement of the north-south playback heads 18 and 20 in opposite angular directions from their predetermined zero position. Since this angular movement is coupled to roller contact 76 by means of plunger rod 96, only the vertical angle of the computer is changed and there is no rotation of the azimuth indicating disk 168. However, the time of arrival of the sound over the array or, concomitantly, the speed of rotation of the recording disk will influence the relative setting of the playback heads, thus giving a reading of the time factor by means of survey range correction shaft 160. Thus, if the north-south plunger 96 is advanced toward roller contact 76, the contact will pivot on shaft 150 without affecting the rotation of yoke joint frame 144 and azimuth shaft 164 but with a rotation of the beveled gears 156 and 158. Correction shaft 160 is rotatably driven, thus actuating indicating needle marker 163. The rotation of the north-south alignment knob 56 will change this setting even if the azimuth remains constant.

It can be readily seen that since it is possible for the roller contact 76 to pivot in either direction about shaft 150 when playback head adjustments are made, two similar survey range correction scales may be required. In order to remove ambiguity of reading the azimuth scale, a shield plate 162 is freely mounted on the survey range correction shaft 160 in order to conceal the vernier scale which would otherwise indicate 180° away from the correct reading. With this symmetry of scale construction the entire vector computer rotating unit could be turned by hand for approximately one-half turn, after which it will indicate the same reading on the azimuth scale, but it will be shown by the other azimuth vernier, and the same survey range correction reading may be read but on the other section of the scale. Such a deliberate rotation of the computer mechanism may be made without injury by the action of the strain relief pivot 138 which is normally rigid and is so held by the spring tension of relief springs 174 and 176. As can readily be seen roller contact 76 of the computer is normally free to move about a vertical axis 160 and also about the horizontal axis of shaft 150. When the axis of shaft 150 has come to rest on dead center with one of the positioning plungers, that is, when the axis of shaft 150 is aligned parallel to either of the plunger rods 94 or 96, any forward motion of the plunger surface might, under these circumstances build up damaging stresses in the mechanism if a relief movement is not provided by pivot 138 and bias springs 174 and 176. In this so-called dead center position, yoke bracket plate 82 will pivot with shaft 138 to which it is affixed thereby unbalancing the normal spring tensions of springs 174 and 176 as hereinabove described. Any pivoting about shaft 150 creates an unstable equilibrium and, before the full adjustments have been made, the roller contact will return to its stable equilibrium position and the pivot shaft 138 at the same time returns to its rigid axial alignment. Summing up, it may be said that the linkages shown in Fig. 2 hold the action of the roller contact rigid through pivot 138 except when these unusual stresses allow it to move on its axis by overpowering one or the other of the relief springs.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A mechanical computer comprising a truncated spherically shaped roller contact having an annular disk centrally positioned intermediate the truncated ends, a yoke bracket plate having a U-shaped cut-out at one end thereof, means for rotatably mounting said plate centrally in said disk whereby said plate extends upwardly therefrom in a vertical plane with the U-shaped cut-out portion distal from said disk, a pair of substantially L-shaped arms having their horizontal legs in juxtaposition transverse to said cut-out and their respective vertical legs disposed on opposite sides of said plate and spaced therefrom, a pivot shaft affixed to the ends of said cut-out portion and extending through each of said horizontal legs such that said arms are adapted to pivot about said pivot shaft, a housing mounted on said pivot shaft, a first rotatable shaft mounted in said housing in spaced relation to said pivot shaft and orthogonal thereto, first and second spring means connected between the respective ends of said first shaft and the corresponding respective free ends of said horizontal legs for maintaining said bracket plate substantially rigid in said vertical plane, an indicating marker, and means connected to said marker and operatively associated with said first shaft for actuating said marker only when said first shaft is as axially rotated.

2. In an azimuth measuring system adapted to record the arrival of sounds wherein the azimuth is a function of the relative angular displacement of two pairs of playback heads, a mechanical vector computer comprising a horizontal axial rotatable shaft, a vertical axial rotatable shaft having one end connected to said horizontal shaft whereby said vertical shaft is axially rotated only when said horizontal shaft is rotated about its axis, the other end of said vertical shaft having a marker affixed thereto, an azimuth indicating member, means for affixing said azimuth indicating member to said horizontal shaft whereby said member rotates only in the plane of said horizontal axis, a pivot shaft disposed transverse to said horizontal shaft and having its longitudinal axis substantially perpendicular to said vertical shaft, a contact member having a predetermined center point, means mounted between the ends of said pivot shaft and said contact member for positioning said contact member with respect to said vertical shaft whereby the movement of said center point actuates said azimuth indicating member and said marker, spring biasing means for maintaining said pivot shaft substantially rigid, discrete orthogonally positioned means operatively associated with said contact member for actuating said member in accordance with the relative angular displacement of each of said pairs of playback heads, said pivot shaft being axially rotated about its axis only when said horizontal shaft is parallel to one of said orthogonally positioned means and said contact is actuated by the forward movement of said one orthogonally positioned means.

3. The device set forth in claim 1 wherein said last-mentioned means comprises a vertically disposed rotatable shaft, and means in abutment with the peripheral surface of said contact member for rotating said first shaft in a horizontal plane about the axis of said second shaft and an indicating dial responsive only to the rotational movement of said first shaft about said axis.

4. In a system adapted to record direction of arrival of sounds wherein the azimuth is a function of the relative anguular displacement of two pairs of playback heads, a mechanical vector computer comprising a horizontally disposed axial rotatable shaft, a vertically disposed axial rotatable shaft, a pivot shaft mutually perpendicular to said vertical and horizontal shafts, an azimuth indicating member, means mounted on said horizontal shaft encompassing said vertical shaft and affixed to said azimuth indicating member whereby said member is adapted to rotate in a horizontal plane about said vertical shaft, gear means affixed to the horizontal shaft and operatively associated with one end of the vertical shaft whereby said vertical shaft is axially rotated only when said horizontal shaft is axially rotated, the other end of said vertical shaft having a marker affixed thereto, a contact member having a prescribed center point, means mounted across and affixed to the ends of said pivot shaft and rotatably mounted in said contact member at substantially the center thereof for linking said gear means to said contact member, spring bias means for maintaining the axis of said pivot shaft substantially rigid, and discrete means orthogonally positioned relative to each other and operatively associated with said contact member for actuating said member in accordance with the relative angular displacement of each of said pairs of playback heads whereby the displacement of said center point actuates said azimuth indicating member and said marker.

5. The device in accordance with claim 4 wherein said linking means comprises a yoke bracket plate having a U-shaped cut-out with the arms thereof affixed to said pivot shaft, a pair of substantially L-shaped arms pivotly mounted on said pivot shaft and having their horizontal legs in juxtaposition transverse to said cut-out portion and their respective vertical legs disposed on opposite sides of said bracket plate and spaced therefrom, said spring bias means comprising discrete springs connected between the respective free ends of said horizontal legs and the corresponding ends of said horizontal shaft, the normal tension of said springs maintaining the axis of said pivot shaft normally rigid when said horizontal legs are parallel to said shaft, said spring tension being unbalanced to rotate said pivot shaft only when one of said contact actuating members is parallel to said horizontal shaft and continuing its forward movement.

6. In an azimuth measuring system adapted to record the arrival of sounds wherein the azimuth is a function of the relative anguluar displacement of two pairs of playback heads, a computer for converting said relative displacements to a reading of the azimuth of sound arrival comprising a contact member having a prescribed center point, a pair of coplanar plunger rods orthogonally positioned relatively to each other, and adapted to actuate said contact member, a vertically disposed axially rotatable shaft, a horizontally disposed axially rotatable shaft, a pivot shaft mutually perpendicular to said vertical and said horizontal shafts and spaced from said horizontally disposed shaft, gear means mounted across said pivot shaft and affixed to said horizontal shaft, said gear means being operatively associated with one end of said vertical shaft whereby axial rotation of said horizontal shaft will produce axial rotation of said vertical shaft, the other end of said vertical shaft having a marker affixed thereto, means affixed to said azimuth indicating member and mounted across the ends of said horizontal shaft whereby said horizontal shaft, said azimuth indicating member, and said pivot shaft rotate as a unit about the axis of said vertical shaft, a plate member linking said gear means and the center of said contact member, said plate member being affixed to said pivot shaft and mounted to rotate freely at the center of said contact member, spring bias means for maintaining said pivot shaft substantially rigid whereby when said contact member is actuated by said plunger rods the rotary motion of said bracket will actuate said azimuth indicating member, and the pivoting motion of said gear means about said horizontal shaft will actuate said marker, said pivot shaft being axially rotated only when said horizontal shaft is parallel to one of said rods and said contact member is actuated by the forward movement of said one rod to unbalance said spring bias means.

7. A computer comprising a truncated spherically shaped contact member having a prescribed center point, orthogonally positioned means in abutment with the spherical surface of said contact member for actuating said member; a first and second indicating dial adapted to rotate in a horizontal plane about a prescribed vertical axis; means linking the center of said member with each of said indicating dials whereby said dials are actuated by the displacement of said center point relative to said axis, said linking means comprising, a yoke bracket plate having a U-shaped cut-out at one end thereof, means for rotatably mounting said plate substantially at said center point whereby said plate extends upwardly therefrom along said vertical axis with the U-shaped cut-out distal from said center point, a pair of substantially L-shaped rocker arms having their horizontal legs in juxtaposition transverse to said cut-out and having their respective vertical legs disposed on opposite sides of said plate and spaced therefrom, a pivot shaft extending transversely through both of the horizontal legs and affixed to the upright arms of said U-shaped cut-out, a housing member mounted on said pivot shaft, a first shaft, means for mounting said first shaft in said housing member whereby said first shaft is adapted to be both axially rotatable and rotatable in a horizontal plane about said vertical axis, second and third shafts coaxial with said axis and respectively connected to said first and second dials, said second and third shafts being operatively associated with said first shaft whereby when said first shaft is axially rotated said first dial is actuated, and when said first shaft is rotated horizontally about said vertical axis, only said second dial is actuated, and spring tension means connected between the respective ends of said first shaft and the corresponding free ends of the horizontal legs for maintaining said pivot shaft substantially rigid.

References Cited in the file of this patent
UNITED STATES PATENTS

| | | |
|---|---|---|
| 2,424,773 | Rieber | July 29, 1947 |
| 2,590,878 | Lyon | Apr. 1, 1952 |